Patented Mar. 8, 1949

2,463,784

UNITED STATES PATENT OFFICE 2,463,784

METHOD OF PREPARING PENTONIC ACIDS FROM PENTOSES

Lewis B. Lockwood, Peoria, Ill., assignor to the United States of America as represented by the Secretary of Agriculture No Drawing. Application August 9, 1946, Serial No. 689,350

14 Claims. (Cl. 195—47)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a method of preparing pentonic acids from the corresponding aldo-pentoses by fermentation with bacteria of the genus Pseudomonas. There are eight possible aldo-pentoses. They are d-arabinose, l-arabinose, d-lyxose, l-lyxose, d-ribose, l-ribose, d-xylose, and l-xylose. Of these, only d-arabinose, l-arabinose, d-ribose, and d-xylose are of common occurrence. This invention relates, more particularly, to the oxidation of these four pentoses to the corresponding pentonic acids, respectively, d-arabonic acid, l-arabonic acid, d-ribonic acid, and d-xylonic acid.

Fermentative oxidation of sugars has a number of advantages over chemical oxidation of sugars in that costly reagents are not required, better yields of oxidized products may be obtained under suitable conditions, and the microbial oxidation processes are more specific, resulting in fewer side reactions leading to contaminating products which interfere with recovery.

The oxidation of arabinose to arabonic acid was reported by Bertrand (Compt. Rend. Acad. Sci., Paris, 127:729-731 (1898), who used acetic acid bacteria. Bertrand (Compt. Rend. Acad. Sci., Paris, 127:124-127 (1898)), also reported the oxidation of xylose to xylonic acid by acetic acid bacteria. The use of bacteria of the genus Pseudomonas for pentose oxidation has not been previously reported in the literature. The use of Pseudomonas instead of acetic acid bacteria offers the advantages that the process is of wider applicability, since acetic acid bacteria do not oxidize some of the pentoses which are readily oxidized by bacteria of the Pseudomonas genus, and since pure synthetic nutrients may be used, although the addition of crude nitrogenous nutrients may be made in some cases where these will not interfere with recovery. It is well known that acetic acid bacteria require the addition of expensive vitamins if purely synthetic mashes are to be used. Such additions are not required by bacteria of the genus Pseudomonas.

In this invention the mashes may be aerated, either at atmospheric pressure or at super-atmospheric pressure by any means known to those skilled in the art. Rotating drums, or deep vessels equipped with disperser stones, agitators, or stirrers may be used as suitable vessels in which to carry out the process.

Considerable latitude is possible in the selection of the nutrients to be used in the conduct of this invention. Thus, the $KH_2PO_4$, $MgSO_4$, and urea may be varied in quantity, or may be omitted, and corn steep liquor, vegetable decoctions, liver extract, or any of the wide variety of nutrient materials now marketed for the culture of micro-organisms, may be substituted for the dehydrated yeast extract.

The following examples illustrate representative procedures used in practicing this invention.

EXAMPLE I

The non-saccharine constituents of all of the culture solutions were the same. They constituted urea, 0.2 gm.; $KH_2PO_4$, 0.6 gm.; $MgSO_4.7H_2O$, 0.25 gm.; dehydrated yeast extract, 0.5 gm.; soybean oil, 3 drops per 100 ml. culture; and $CaCO_3$ in excess of the quantity necessary to neutralize the maximum quantity of pentonic acid which could theoretically be formed from the pentose. The culture solutions were aerated by bubbling air through them at the rate of 100 ml. air per 100 ml. mash per minute. The temperature was maintained at 30° C. d-Arabinose was added to the basal culture solution, and 100 ml. portions of it were inoculated with bacteria of the species: Pseudomonas fragii, P. graveolen, P. synxantha, and P. vendrelli. Analyses of mashes, made after seven days, gave the data contained in Table I.

TABLE I 4.8 grams of d-arabinose in 100 ml. culture solution

| | Grams d-arabonic acid produced per 100 ml. culture | Weight yield grams d-arabonic acid per 100 grams d-arabinose |
|---|---|---|
| Pseudomonas fragii 73 | 1.20 | 25.0 |
| Pseudomonas graveolens 14 | .73 | 15.2 |
| Pseudomonas synxantha 79 | 2.02 | 42.1 |
| Pseudomonas vendrelli 23 | .73 | 15.2 |

EXAMPLE II l-Arabinose instead of d-arabinose was added to the basal culture solution described in Example I. 100 ml. portions were inoculated with bacteria of the species Pseudomonas fluorescens, P. fragii, P. mildenbergii, P. putida, P. synxantha, and P. vendrelli. Analyses made after six days gave the data presented in Table II.

TABLE II

*4.9 grams of l-arabinose per 100 ml. culture solution*

|  | Grams l-arabonic acid produced per 100 ml. culture | Weight yield grams l-arabonic acid per 100 grams l-arabinose |
|---|---|---|
| Pseudomonas fluorescens 6 | 1.38 | 28.2 |
| Pseudomonas fragii 25 | 1.75 | 35.7 |
| Pseudomonas mildenbergii 21 | 1.41 | 28.8 |
| Pseudomonas putida 13 | 2.34 | 47.8 |
| Pseudomonas synxantha 79 | .86 | 17.5 |
| Pseudomonas vendrelli 23 | 2.22 | 45.4 |

EXAMPLE III d-Ribose, instead of d-arabinose, was added to the basal culture solution described in Example I. 100 ml. portions were inoculated with bacteria of of the species *Pseudomonas fluorescens*, *P. graveolens*, *P. mildenbergii*, *P. ovalis*, *P. putifaciens*, *P. synxantha*, and *P. vendrelli*. Analyses made after nine days gave the data in Table III.

TABLE III

*5.9 grams d-ribose per 100 ml. culture solution*

|  | Grams d-ribonic acid produced per 100 ml. culture | Weight yield grams d-ribonic acid per 100 grams d-ribose |
|---|---|---|
| Pseudomonas fragii 25 | 1.08 | 18.4 |
| Pseudomonas mildenbergii 21 | 0.58 | 9.9 |
| Pseudomonas ovalis 8 | 0.41 | 7.0 |
| Pseudomonas putrifaciens 76 | 0.81 | 14.8 |
| Pseudomonas synxantha 79 | 1.69 | 28.8 |
| Pseudomonas vendrelli 23 | 2.89 | 49.3 |
| Pseudomonas fluorescens 6 | 4.11 | 70.0 |

EXAMPLE IV d-Xylose, instead of d-arabinose, was added to the basal culture solution described in Example I. 100 ml. portions were inoculated with bacteria of the species *Pseudomonas fluorescens*, *P. fragii*, *P. graveolens*, *P. mildenbergii*, *P. ovalis*, and *P. putida*. Analyses made after three days gave the data presented in Table IV.

TABLE IV

*6.7 grams d-xylose per 100 ml. culture solution*

|  | Grams d-xylonic acid produced per 100 ml. culture | Weight yield grams d-xylonic acid per 100 grams d-xylose |
|---|---|---|
| Pseudomonas fluorescens 6 | 4.59 | 68.5 |
| Pseudomonas fragii 25 | 1.89 | 28.2 |
| Pseudomonas graveolens 14 | 3.78 | 55.5 |
| Pseudomonas mildenbergii 21 | 4.87 | 72.9 |
| Pseudomonas ovalis 8 | 2.66 | 39.7 |
| Pseudomonas putida 13 | 4.40 | 65.7 |

Having thus described my invention, I claim:

1. A process of making a pentonic acid comprising inoculating a nutrient medium containing an aldo-pentose with bacteria of the genus Pseudomonas, and aerating the medium, a neutralizing agent for the pentonic acid formed being present.

2. A process of making d-arabonic acid comprising inoculating a nutrient medium containing d-arabinose with bacteria of the genus Pseudomonas, and aerating the medium, a neutralizing agent for the pentonic acid formed being present.

3. A process of making d-ribonic acid comprising inoculating a medium containing d-ribose with bacteria of the genus Pseudomonas, and aerating the medium, a neutralizing agent for the pentonic acid formed being present.

4. A process of making d-xylonic acid comprising inoculating a medium containing d-xylose with bacteria of the genus Pseudomonas, and aerating the medium, a neutralizing agent for the pentonic acid formed being present.

5. The process of claim 1 in which the bacteria is *Pseudomonas fluorescens*.

6. The process of claim 1 in which the bacteria is *Pseudomonas mildenbergii*.

7. The process of claim 2 in which the bacteria is *Pseudomonas fragii*.

8. The process of claim 3 in which the bacteria is *Pseudomonas fluorescens*.

9. The process of claim 4 in which the bacteria is *Pseudomonas fluorescens*.

10. The process of claim 4 in which the bacteria is *Pseudomonas mildenbergii*.

11. The process of claim 1 in which the neutralizing agent is a calcium compound.

12. The process of claim 1 in which the neutralizing agent is calcium carbonate and the temperature is maintained at about 30° C., the calcium carbonate being in excess of the quantity necessary to neutralize the maximum theoretical yield of pentonic acid from the pentose.

13. A process of converting d-xylose to d-xylonic acid in high yields, comprising inoculating a nutrient medium containing d-xylose with *Pseudomonas fluorescens*, and aerating the medium, the said medium containing urea, $KH_2PO_4$, $MgSO_4$, dehydrated yeast extract, and calcium carbonate in excess of the quantity necessary to neutralize the maximum theoretical yield of d-xylonic acid from d-xylose.

14. A process of making a pentonic acid comprising inoculating a nutrient medium containing an aldo-pentose with bacteria of the genus Pseudomonas, and aerating the medium, the said medium containing urea, $KH_2PO_4$, $MgSO_4$, dehydrated yeast extract, and calcium carbonate in excess of the quantity necessary to neutralize the maximum theoretical yield of pentonic acid from the pentose.

LEWIS B. LOCKWOOD.

REFERENCES CITED

The following references are of record in the file of this patent:

UNITED STATES PATENTS

| Number | Name | Date |
|---|---|---|
| 2,356,581 | Grandel | Aug. 22, 1944 |

OTHER REFERENCES

Lockwood et al., J. Bact., July 1941, page 54.

Chemical Abstracts, vol. 34, 7321, 7 and 8 (1940), citing V. V. Pervozvankii-Microbiology (U. S. S. R.) 8, No. 2, 149–159 (1939), and No. 3–4, 339–52.